United States Patent [19]

Nogami

[11] 4,254,996
[45] Mar. 10, 1981

[54] FLUID PRESSURE CONTROL DEVICE FOR VEHICLE BRAKING SYSTEMS

[75] Inventor: Tomoyuki Nogami, Toyota, Japan

[73] Assignee: Toyoda Jidosha Kogyo Kabushiki Kaisha, Toyota, Japan

[21] Appl. No.: 94,751

[22] Filed: Nov. 16, 1979

[30] Foreign Application Priority Data

Nov. 20, 1978 [JP] Japan .............................. 53-143115

[51] Int. Cl.³ .............................................. B60T 8/14
[52] U.S. Cl. .................................. 303/6 C; 303/24 C; 303/24 F
[58] Field of Search ................. 303/24 A, 24 F, 24 C, 303/6 C; 188/349

[56] References Cited

U.S. PATENT DOCUMENTS

| | | | |
|---|---|---|---|
| 4,072,363 | 2/1978 | Tomoyuki | 303/24 C |
| 4,161,339 | 7/1979 | Kawaguchi et al. | 303/24 C |
| 4,181,370 | 1/1980 | Noeami et al. | 303/24 F |

Primary Examiner—Douglas C. Butler
Attorney, Agent, or Firm—Oblon, Fisher, Spivak, McClelland & Maier

[57] ABSTRACT

A fluid pressure control device in the form of an inertia-controlled valve unit comprises a bypass passage provided through a stepped piston to directly apply the master cylinder pressure to the wheel brake cylinders; a bypass valve including a valve seat provided within the bypass passage to permit the bypass flow of fluid between the inlet and outlet ports, a valve member axially movable within the bypass passage to co-operate with the valve seat to block the bypass flow, and a spring biasing the valve member toward the inlet port, the bypass valve being closed when a pressure difference between the inlet and outlet ports is below a predetermined value and being opened when the pressure difference exceeds the predetermined value; and an extension rod extended from the valve member toward the inlet port and being engageable with the inner wall of the valve housing to open the bypass valve.

6 Claims, 4 Drawing Figures

FLUID PRESSURE CONTROL DEVICE FOR VEHICLE BRAKING SYSTEMS

BACKGROUND OF THE INVENTION

The present invention relates to fluid pressure control devices for vehicle braking systems, and more particularly to an improvement of a fluid pressure control device in the form of such an inertia-controlled valve unit as disclosed in U.S. Pat. No. 4,072,363 issued on Feb. 7, 1978.

A conventional inertia-controlled valve unit of this type comprises a housing provided thereon with an inlet port for connection to a master cylinder and an outlet port for connection to wheel brake cylinders and provided therein with a stepped bore in communication with the inlet and outlet ports respectively at the small and large diameter portions thereof and an inner bore provided in parallel with the stepped bore and in communication with the small and large diameter portions of the stepped bore, a stepped piston reciprocable within the stepped bore to form first and second fluid chambers respectively in communication with the inlet and outlet ports, a spring loading the piston axially in a direction toward the outlet port, and a cut-off valve assembly including a valve seat provided within the inner bore to permit the flow of fluid between the first and second chambers and an inertia-controlled valve element housed within the inner bore to co-operate with the valve seat to block the flow of fluid from the first chamber to the second chamber when the valve element is subjected to a deceleration in excess of a predetermined value. In operation of such an inertia-controlled valve unit under the normally loaded condition of the vehicle, the stepped piston acts to increase the pressure trapped in the wheel brake cylinders after closing of the cut-off valve, but, owing to the difference between the effective pressure receiving areas of the piston, the rate of increase is less than the rate of increase in the master cylinder pressure. This results in insufficient braking effect under the excessively loaded condition of the vehicle.

SUMMARY OF THE INVENTION

It is, therefore, a primary object of the present invention to provide an improved inertia-controlled valve unit wherein after closing of the cut-off valve under the excessively loaded condition of the vehicle, the master cylinder pressure is directly applied to the wheel brake cylinders to ensure sufficient braking effect.

According to the present invention there is provided a fluid pressure control device for incorporation in a vehicle braking system between a master cylinder and a wheel brake cylinder, which device comprises:

a housing for mounting on a vehicle body structure, the housing being provided with an inlet port for connection to the master cylinder, and output port for connection to the wheel brake cylinder, a stepped bore having small and large diameter portions, the bore being in communication with the inlet and outlet ports at the small and large diameter portions respectively, and an inner bore provided in parallel with the stepped bore, the inner bore communicating at one end thereof with the small diameter portion of the stepped bore and at the other end thereof with the large diameter portion of the stepped bore;

a stepped piston reciprocable within the stepped bore to form first and second fluid chambers communicating with the inlet and outlet ports respectively, the smaller end of the piston being exposed in the first chamber and the larger end in the second chamber;

a spring biasing the piston, in the axial direction thereof, toward the outlet port;

a cut-off valve including a valve seat provided within the inner bore to permit the flow of fluid between the first and second fluid chambers, and an inertia-controlled valve element housed within the inner bore to co-operate with the valve seat to block the flow of fluid from the first chamber to the second chamber when the valve element is subjected to a deceleration in excess of a predetermined value;

a bypass passage provided through the axis of the stepped piston and communicating at the opposite ends thereof into the first and second chambers;

a bypass valve including a valve seat provided within the bypass passage to permit the bypass flow of fluid between the first and second chambers, a valve member axially movable within the bypass passage to co-operate with the second-named valve seat to block the bypass flow, and a second spring biasing the valve member, in the axial direction thereof, toward the first chamber, the bypass valve being closed when a pressure difference between the first and second chambers is below a predetermined value and being opened when the pressure difference exceeds the predetermined value; and an extension rod extended from the valve member into the first chamber and being engageable with the inner wall of the stepped bore to open the bypass valve.

Preferably, the pressure control device comprises a second piston slidably disposed within an extended portion of the stepped bore and being exposed at the inner end thereof in the first fluid chamber and engageable with the extension rod, and a third spring biasing the second piston, in the axial direction thereof, toward the first fluid chamber, the resilient force of the third spring being larger than that of the second spring. This serves to facilitate air-purge from the control device when brake fluid is being charged into the vehicle braking system.

BRIEF DESCRIPTION OF THE DRAWINGS

Additional objects and advantages of the present invention will be more readily apparent from the following detailed description of preferred embodiments thereof when taken together with the accompanying drawings in which.

DESCRIPTION OF THE PREFERRED EMBODIMENTS

Figure 1:
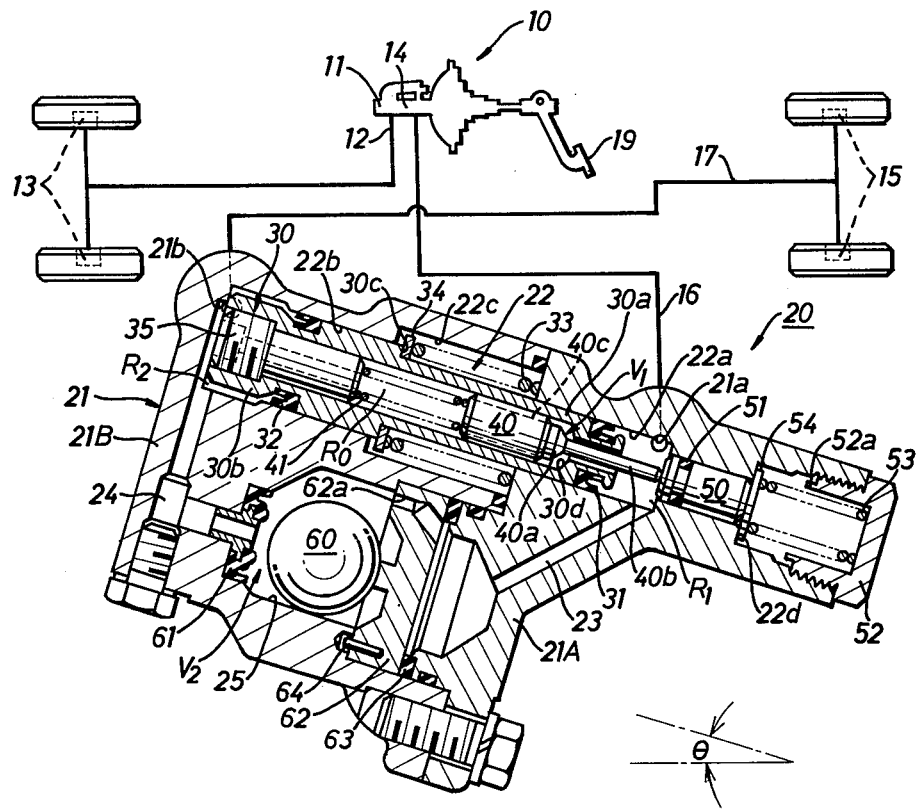
FIG. 1 illustrates a view in longitudinal section of a pressure control device in accordance with the present invention, which is incorporated in a vehicle braking system.

Referring now to the drawings, particularly in FIG. 1 there is illustrated a conventional tandem master cylinder 10 which is operated by depression of a foot brake pedal 19. The master cylinder 10 has a front pressure chamber 11 connected to front wheel brake cylinders 13 by way of a conduit 12 and a rear pressure chamber 14 connected to rear wheel brake cylinders 15 by way of conduits 16 and 17. Interposed between the conduits 16 and 17 is a pressure control device 20 in the form of an inertia-controlled valve unit according to the present invention which is fixedly mounted on the vehicle body structure at an inclined angle $\theta$.

The control device 20 comprises a housing assembly 21 in which a stepped piston 30, a valve spool 40, a straight piston 50 and an inertia-controlled ball 60 are assembled, as described later in detail. The housing assembly 21 includes a rear housing section 21A provided thereon with an inlet port 21a and a front housing section 21B provided thereon with an outlet port 21b. The inlet port 21a is connected to the rear pressure chamber 14 of master cylinder 10 by way of conduit 16, and the outlet port 21b is connected to the rear wheel brake cylinders 15 by way of conduit 17. Within the housing assembly 21, a stepped cylindrical bore 22 is formed in parallel with a stepped inner bore 25. The stepped cylindrical bore 22 includes a small diameter portion 22a to which the inlet port 21a opens, a large diameter portion 22b to which the outlet port 21b opens and an intermediate portion 22c in which a compression coil spring 33 is assembled. The stepped inner bore 25 communicates into the small and large diameter portions 22a and 22b respectively through first and second passages 23 and 24.

The rear housing section 21A is further provided at its inner end face with an annular protrusion which is coupled in a fluid-tight manner within a large diameter portion of stepped inner bore 25 through an annular seal member. Thus, the rear housing section 21A is firmly fitted to the front housing section 21B by fastening bolts. Due to this assembling construction, the sealing effect is maintained between the rear and front housing sections 21A, 21B even if a space is produced between the engagement faces of the rear and front housing sections. A partition plate 62 is snugly engaged within the large diameter portion of inner bore 25 to subdivide the interior of bore 25 into two chambers. The partition plate 62 is also engaged at its back face with the annular protrusion of rear housing section 21A through an annular seal member 63 in such a manner that it is fixed in position due to resilient abutment against the stepped portion of bore 25. The partition plate 62 is further provided at its upper portion with a fluid passage 62a to provide a fluid communication between the two chambers. A knock-pin 64 is fixed to the bottom portion of partition plate 62 and inserted into the stepped portion of bore 25 so as to secure the partition plate 62 in position.

The stepped piston 30 is axially reciprocable within the stepped cylindrical bore 22 through annular seal members 31, 32 to form a first fluid chamber $R_1$ at its small diameter portion 30a and a second fluid chamber $R_2$ at its large diameter portion 30b. The first fluid chamber $R_1$ is in open communication with inlet port 21a and first passage 23, while the second fluid chamber $R_2$ is in open communication with outlet port 21b and second passage 24. The compression coil spring 33 is engaged at one end thereof with the inner end wall of rear housing section 21A and at the other end thereof with the inner shoulder 30c of stepped piston 30 through an annular retainer 34. Thus, the stepped piston 30 is loaded toward the second fluid chamber $R_2$ and abuts at its large diameter end against the inner wall of stepped bore 22. The stepped piston 30 is further provided therein with an axial bore which provides a fluid communication between the first and second fluid chambers $R_1$ and $R_2$. A bypass passage $R_0$ is formed by the axial bore in which the valve spool 40 is axially movable.

The valve spool 40 is provided with a valve part 40a which co-operates with a valve seat 30d in bypass passage $R_0$ to provide a bypass valve $V_1$. A tubular retainer piece 35 is threaded into the large diameter portion of piston 30 and receives at its inner end a coil spring 41 which biases the valve spool 40 toward the first fluid chamber $R_1$ with a predetermined load. The valve spool 40 is integrally provided with an extension rod 40b extending from the valve part 40a into the first fluid chamber $R_1$ and at its outer periphery with axial grooves 40c which allow therethrough the flow of brake fluid between the first and second fluid chambers $R_1$ and $R_2$.

The straight piston 50 is axially reciprocable within an extended portion of stepped bore 22 through an annular seal member 51 and in engagement with the extension rod 40b of valve spool 40. A coil spring 53 is interposed between a retainer plate 54 and a screwed plug 52 to bias the piston 50 toward the first fluid chamber $R_1$ with a predetermined load. The plug 52 is threaded into the rear housing section 21A to receive the coil spring 53, and the axial movement of retainer plate 54 is restricted by engagements with a stepped portion 22d of bore 22 and an annular protrusion 52a of plug 52. In practices of the present invention, the straight piston 50 may be eliminated to form the inner wall of stepped bore 22, as described later with reference to FIG. 3.

The inertia-controlled ball 60 housed within inner bore 25 is free to roll forwardly up the inclined bottom of bore 25 and co-operates with an annular valve seat 61 secured to the side wall of bore 25 to provide a cut-off valve $V_2$. The ball 60 normally rests under gravity in the position shown in the drawing and is received by a central boss of partition plate 62. In braking operation, when the rate of deceleration caused by the application of the brakes exceeds a predetermined value $g_0$, the ball 60 will roll forwardly due to the inertia force acting thereof toward the valve seat 61 so that the cut-off valve $V_2$ is closed to interrupt fluid communication between the first and second fluid chambers $R_1$ and $R_2$.

Figure 2:
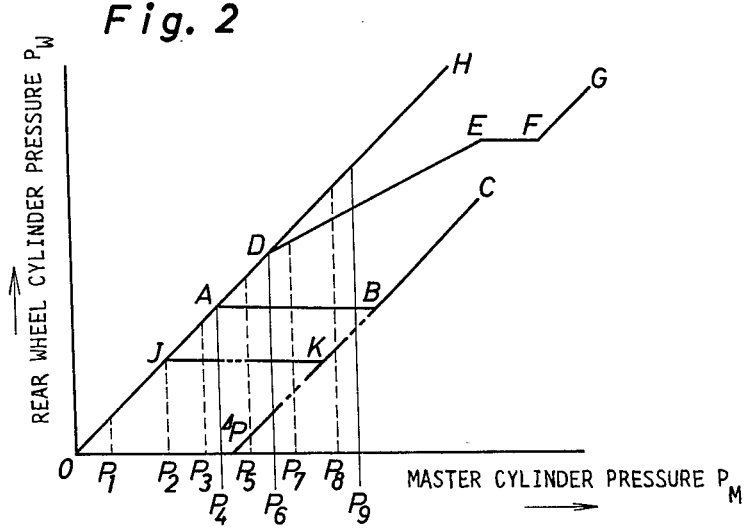
FIG. 2 is a graph indicating the pressure controlling characteristics of the control device.

In the pressure control device 20 described above, the setting load of spring 53 is determined to be larger than that of spring 41 such that the bypass valve $V_1$ is opened due to initial engagement of the extension rod 40b against the straight piston 50 when the pressure in the first fluid chamber $R_1$ is below a predetermined value $P_2$, as shown in FIG. 2. This serves to facilitate air purge from the control device 20 as described hereinafter. When supplying brake fluid into the braking system with the control device 20, prior to supply of brake fluid bleed plugs (not shown) provided on the rear wheel brake cylinders 15 are released. Under this condition, when the master cylinder 10 is operated by repeated depression of the brake pedal 19, brake fluid supplied into the rear pressure chamber 14 of master cylinder 10 is delivered into the first fluid chamber $R_1$ of control device 20 through conduit 16 and inlet port 21a. The supplied brake fluid then flows into the second fluid chamber $R_2$ through the opened bypass valve $V_1$ and the bypass passage $R_0$ and is bifurcated to flow into the second fluid chamber $R_2$ through the first passage 23, the passage 62a of partition plate 62, the inner bore 25, the valve seat 61 and the second passage 24 in sequence. Thus, the brake fluid in the second fluid chamber $R_2$ flows into the rear wheel brake cylinders 15 through outlet port 21b and conduit 17 to be finally drained out from the bleed plugs. In this instance, the inertia-controlled ball 60 does not seat on the valve seat 61 because of bifurcation of the brake fluid into the bypass passage $R_0$ and the first passage 23. During the fluid delivery process as mentioned above, the air passes together with the fluid through outlet port 21b and conduit 17 to reach the rear wheel brake cylinders 15 finally to be drained out with the fluid from the bleed plugs. After the air-purging process is complete within the hydraulic circuit for the rear wheel brake cylinders 15, the bleed plugs are closed to effect the braking features.

Hereinafter the pressure controlling characteristics of the control device 20 will be described with reference to FIG. 2.

(1) Under the unloaded condition of the vehicle, depression of the brake pedal 19 produces fluid pressure within the pressure chamber 11 and 14 of master cylinder 10. The pressure in front pressure chamber 11 is applied directly to the front wheel brake cylinders 13 through conduit 12, and the pressure in rear pressure chamber 14 is applied under the control of pressure control device 20 to the rear wheel brake cylinders 15 through conduits 16 and 17. Thus, the vehicle is braked in accordance with the value of the master cylinder pressure applied to the front and rear wheel brake cylinders 13 and 15.

In this braking operation, within the control device 20, the stepped piston 30, the spool 40, the straight piston 50 and the inertia-controlled ball 60 do not move until the master cylinder pressure $P_M$ reaches a value of $P_1$. When the pressure in first fluid chamber $R_1$ reaches the value of $P_1$, the straight piston 50 starts to move against the spring 53 and is separated from the extension rod 40b of spool 40 to close the bypass valve $V_1$ when the pressure in first fluid chamber $R_1$ reaches a value of $P_2$. During this initial stage, the pressure in first fluid chamber $R_1$ is applied to the second fluid chamber $R_2$ through the bypass passage $R_0$ in stepped piston 30 and is further applied to the second fluid chamber $R_2$ through the passage 23, the valve seat 61 and the second passage 24. In this instance, the inertia-controlled ball 60 does not seat on the valve seat 61 because of bifurcation of the fluid under pressure.

When the pressure in first fluid chamber $R_1$ reaches a value of $P_3$, the retainer plate 54 abuts against the annular protrusion 52a of plug 52 to arrest the straight piston 50. When the rate of deceleration caused by the application of the brakes exceeds the predetermined value $g_0$, the ball 60 rolls forwardly toward the valve seat 61 due to the inertia force acting thereon so that the cut-off valve $V_2$ is closed to interrupt the fluid communication between the inner bore 25 and the second passage 24, which is indicated by a character A in FIG. 2. At this stage, until the master cylinder pressure $P_M$ reaches a value of $P_4 + \Delta P$, the stepped piston 30 does not move rearwardly, and the pressure $P_W$ in rear wheel brake cylinders 15 does not increase, as shown by a segment line between characters A and B in FIG. 2. When the master cylinder pressure $P_M$ reaches the value of $P_4 + \Delta P$ to cause a pressure difference $\Delta P$ between the first and second fluid chambers $R_1$ and $R_2$, the valve spool 40 is moved by the pressure difference $\Delta P$ to open the bypass valve $V_1$, and thereafter the bypass valve $V_1$ is repeatedly closed and opened to increase the pressure in rear wheel brake cylinders 15, as shown by a segment line between B and C in FIG. 2. In addition, after the master cylinder pressure $P_M$ reaches the value of $P_4$, the ball 60 is held on the valve seat 61 due to the inertia and the difference in pressure between the inner bore 25 and the second passage 24.

(2) Under the loaded condition of the vehicle, when the master cylinder pressure $P_M$ reaches a value of $P_6$ higher than the value of $P_4$, the rate of deceleration exceeds the predetermined value $g_0$ to roll the ball 60 forwardly toward the valve seat 61. At this initial stage, the straight piston 50 is moved against the spring 53 to close the bypass valve $V_1$ in the same process as described above, and subsequently the stepped piston 30 starts to move rearwardly against the resilient force of spring 33 owing to the difference between the effective pressure receiving areas of piston 30. This means that prior to closing of the cut-off valve $V_2$ the stepped piston 30 moves rearwardly in a certain distance. When the master cylinder pressure $P_M$ is increased higher than the value of $P_6$ by continued depression of the brake pedal 19, the stepped piston 30 is moved forwardly by the increased pressure in first fluid chamber $R_1$ to act on the brake fluid trapped in second fluid chamber $R_2$ due to the closing of the cut-off valve $V_2$. Thus, the stepped piston 30 acts to increase the pressure in rear wheel brake cylinders 15, but, owing to the difference between the effective pressure receiving areas of piston 30, the rate of increase is less than the rate of increase in the master cylinder pressure $P_M$, as shown by a segment line between characters D and E in FIG. 2.

When the rear wheel cylinder pressure $P_W$ increases up to a value of E, the stepped piston 30 abuts against the inner wall of bore 22 to maintain the rear wheel cylinder pressure $P_W$ in the value of E, which is indicated by a segment line E and F in FIG. 2. When the master cylinder pressure $P_M$ is further increased to cause the pressure difference $\Delta P$ between first and second fluid chambers $R_1$ and $R_2$, the bypass valve $V_1$ is opened to directly apply the master cylinder pressure $P_M$ to the rear wheel brake cylinders 15, as shown by a segment line between F and G in FIG. 2.

(3) Under the excessively loaded condition of the vehicle, the inertia force acting on the vehicle in braking operation becomes greater than that under the normally loaded condition (2). It is, therefore, noted that when the master cylinder pressure $P_M$ reaches a value of $P_9$ higher than the value of $P_6$, the rate of deceleration will exceed the predetermined value $g_0$ to roll the ball 60 forwardly toward the valve seat 61. During this initial braking operation, the straight piston 50 is moved against the resilient force of spring 53 to close the bypass valve $V_1$ in the same process as described above, and the stepped piston 30 starts to move rearwardly against the resilient force of spring 33 due to increase of the master cylinder pressure $P_M$ up to a value of $P_5$. When the master cylinder pressure $P_M$ reaches a value of $P_7$, the stepped piston 30 is temporarily arrested by engagement of its extension rod 40b against the retracted piston 50, and due to increase of the master cylinder pressure $P_M$ up to a value of $P_8$, the stepped piston 30 is further moved rearwardly against the resilient force of springs 33 and 41 to open the bypass valve $V_1$. This means that after the ball 60 is held on the valve seat 61 to close the cut-off valve $V_2$, the control device 20 acts to directly apply the master cylinder pressure $P_M$ to the rear wheel brake cylinders 15 to thereby ensure sufficient braking effect, which is indicated by a segment line O and H in FIG. 2.

(4) In case the hydraulic circuit for front wheel brake cylinders 13 is damaged, the braking effect is conducted only by operation of the rear wheel brake cylinders 15, and irrespective of loads of the vehicle, the rate of deceleration acting on the ball 60 does not exceed the predetermined value $g_O$ prior to increase of the master cylinder pressure $P_M$ up to the value of $P_8$. As a result, the master cylinder pressure $P_M$ is directly applied to the rear wheel brake cylinders 15 in the same manner as the braking operation (3) described above.

In each of the braking operations described above, even if the ball 60 sits on the valve seat 61 regardless of the rate of deceleration before the master cylinder pressure reaches the value of $P_2$, the bypass valve $V_1$ will open due to engagement of the extension rod 40b against the straight piston 50 until the master cylinder pressure $P_M$ reaches the value of $P_2$, and subsequently opening and closing of the bypass valve $V_1$ is repeatedly conducted after the master cylinder pressure $P_M$ reaches the value of $P_2+\Delta P$. Thus, the pressure applied to rear wheel brake cylinders 15 is controlled as shown by a characteristic line O-J-K-B-C in FIG. 2.

Figure 3:
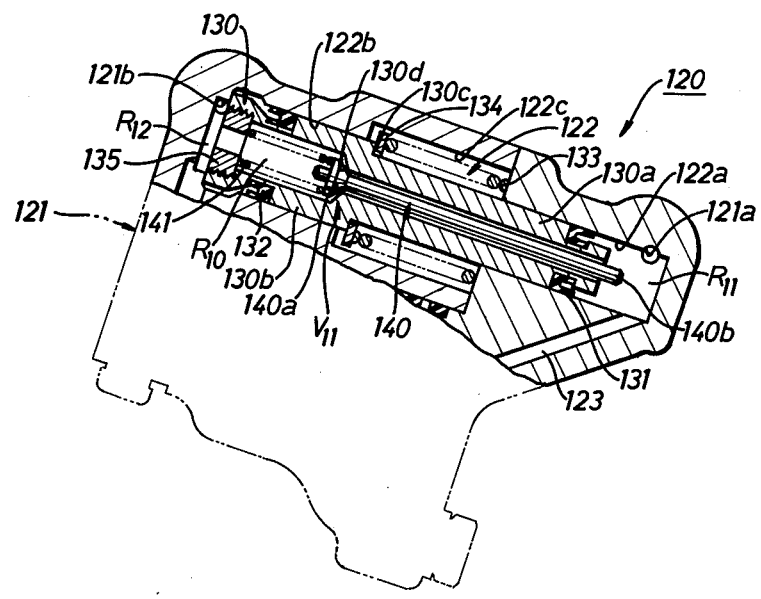
FIG. 3 illustrates a view in longitudinal section of a modified control device according to the present invention.

In FIG. 3, there is illustrated a modification of the previous embodiment shown in FIG. 1 in which the straight piston 50 is eliminated. In this modified pressure control device 120, a stepped piston 130 is axially reciprocable within a stepped cylindrical bore 122 through annular seal members 131, 132 to form a first fluid chamber $R_{11}$ at its small diameter portion 130a and a second fluid chamber $R_{12}$ at its large diameter portion 130b. The first fluid chamber $R_{11}$ is connected to the conduit 16 through an inlet port 121a, while the second fluid chamber $R_{12}$ is connected to the conduit 17 through an outlet port 121b. A compression coil spring 133 is engaged at one end thereof with the inner wall of a housing assembly 121 and at the other end thereof with an inner shoulder 130c of stepped piston 130 through an annular retainer 134. Thus, the stepped piston 130 is loaded toward the second fluid chamber $R_{12}$ and abuts at its large diameter end against the inner wall of bore 122. The stepped piston 130 is further provided therein with a bypass passage $R_{10}$ in the form of an axial bore in which a valve member 140 is assembled to be axially movable. The valve member 140 is provided with a valve part 140a which co-operates with a valve seat 130d in bypass passage $R_{10}$ to provide a bypass valve $V_{11}$. An annular piece 135 is threaded into the large diameter portion 130b of piston 130 and receives thereon a coil spring 141 which biases the valve member 140 toward the first fluid chamber $R_{11}$ with a predetermined load. The valve member 140 also includes an extension rod 14b extending from the valve part 140a into the first fluid chamber $R_{11}$. All other constructions remain unchanged in the same as those of the previous embodiment described above in detail.

Figure 4:
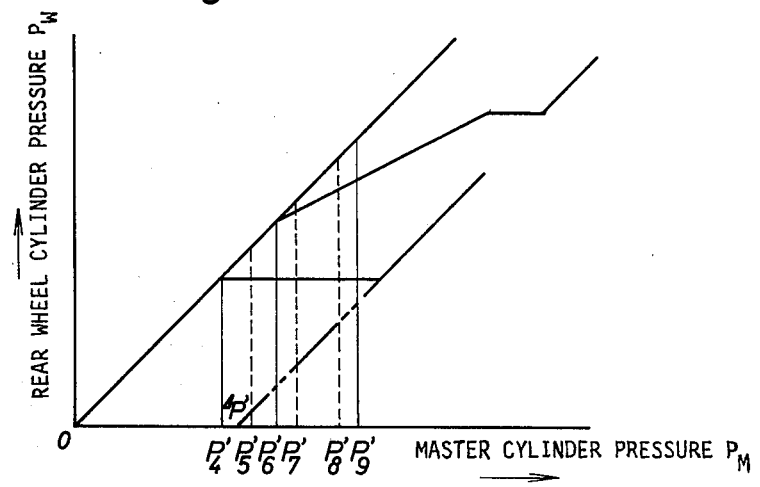
FIG. 4 is a graph indicating the pressure controlling characteristics of the modified control device.

FIG. 4 illustrates the pressure controlling characteristics of the modified control device 120 which are substantially the same as those of the previous embodiment. In FIG. 4, the character $P_4'$ indicates a value of pressure to close the cut-off valve $V_2$ under the unloaded condition of the vehicle, and the character $\Delta P'$ indicates a value of pressure difference necessary for opening the bypass valve $V_{11}$. The character $P_5'$ indicates a value of pressure to move the stepped piston 130 toward the first fluid chamber $R_{11}$ prior to closing of the cut-off valve $V_2$, the character $P_6'$ indicates a value of pressure to close the cut-off valve $V_2$ under the normally loaded condition of the vehicle, the character $P_7'$ indicates a value of pressure to conduct engagement of the extension rod 140b with the inner wall of stepped bore 122, the character $P_8'$ indicates a value of pressure to further move the stepped piston 130 toward the first fluid chamber $R_{11}$ prior to closing of the cut-off valve $V_2$ to thereby open the bypass valve $V_{11}$, and the character $P_9'$ indicates a value of pressure to close the cut-off valve $V_2$ under the excessively loaded condition of the vehicle.

Having now fully set forth both structure and operation of preferred embodiments of the concept underlying the present invention, various other embodiments as well as certain variations and modifications of the embodiments herein shown and described will obviously occur to those skilled in the art upon becoming familiar with said underlying concept. It is to be understood, therefore, that within the scope of the appended claims, the invention may be practiced otherwise than as specifically set forth herein.

What is claimed is:

1. In a fluid pressure control device for incorporation in a vehicle braking system between a master cylinder and a wheel brake cylinder, which device comprises:

a housing for mounting on a vehicle body structure, said housing being provided with an inlet port for connection to said master cylinder, an outlet port for connection to said wheel brake cylinder, a stepped bore having small and large diameter portions respectively in communication with said inlet and outlet ports, and an inner bore formed in parallel with said stepped bore and communicating at one end thereof with the small diameter portion of said stepped bore and at the other end thereof with the large diameter portion of said stepped bore;

a stepped piston axially reciprocable within said stepped bore to form first and second fluid chambers communicating with said inlet and outlet ports respectively, said stepped piston including a smaller end exposed within the small diameter portion of said stepped bore and a larger end exposed within the larger diameter portion of said stepped bore; a spring biasing said piston, in the axial direction thereof, toward said outlet port; and a cut-off valve including a valve seat provided within said inner bore to permit the flow of fluid between the first and second fluid chambers, and an inertia-concontrolled valve element housed within said inner bore to co-operate with said valve seat to block the flow of fluid from the first chamber to the second chamber when said valve element is subjected to a deceleration in excess of a predetermined value;

the improvement comprising:

a bypass passage provided through the axis of said stepped piston and communicating at the opposite ends thereof into the first and second chambers;

a bypass valve including a valve seat provided within said bypass passage to permit the bypass flow of fluid between the first and second chambers, a valve member axially movable within said bypass passage to co-operate with said second-named valve seat, and a second spring biasing said valve member, in the axial direction thereof, toward the first chamber to close said bypass valve; and an extension rod extending from said valve member into the first chamber and being engageable with the inner wall of said stepped bore to open said bypass valve against biasing force of said second spring.

2. A fluid pressure control device as claimed in claim 1, wherein said valve member of said bypass valve is a valve spool axially movable within said bypass passage and being provided with a valve part co-operating with said second-named valve seat and an axial groove permitting the bypass flow of fluid therethrough.

3. A fluid pressure control device as claimed in claim 1 or 2, further comprising a second piston slidably disposed within an extended portion of said stepped bore and being exposed at the inner end thereof in the first fluid chamber and engageable with said extension rod, and a third spring biasing said second piston, in the axial direction thereof, toward the first fluid chamber, the resilient force of said third spring being larger than that of said second spring, and said second piston being in engagement with said extension rod to open said bypass valve when the pressure in the first fluid chamber is below a predetermined value and being separated from said extension rod to close said bypass valve when the pressure in the first fluid chamber exceeds the predetermined value.

4. A fluid pressure control device as claimed in claim 3, wherein said third spring is a coil spring engaged at one end thereof with the outer end of said second piston and at the other end thereof with a plug threaded into said housing, said coil spring being compressed in a predetermined value larger than the biasing force of said second spring.

5. A fluid pressure control device as claimed in claim 4, said plug is provided with an annular protrusion to receive thereon said second piston so as to define the retracted position of said second piston.

6. A fluid pressure control device as claimed in claim 1, wherein said extension rod is separated from the inner wall of said stepped bore such that said bypass valve is normally closed under the inoperative condition of said master cylinder.

* * * * *

UNITED STATES PATENT AND TRADEMARK OFFICE
CERTIFICATE OF CORRECTION

PATENT NO. : 4,254,996

DATED : 03/10/81

INVENTOR(S) : Tomoyuki Nogami et al.

It is certified that error appears in the above-identified patent and that said Letters Patent is hereby corrected as shown below:

Title Page:

--Assignee information is incorrectly recorded. It should read:

Toyota Jidosha Kogyo Kabushiki Kaisha--

Signed and Sealed this

Thirty-first Day of May, 1988

Attest:

DONALD J. QUIGG

*Attesting Officer*    *Commissioner of Patents and Trademarks*